(12) United States Patent
Wu

(10) Patent No.: US 7,341,386 B2
(45) Date of Patent: Mar. 11, 2008

(54) OPTICAL FIBER WIRE CLIP

(75) Inventor: Chin-Yi Wu, Taiping (TW)

(73) Assignee: Accton Technology Corporation, Hsinchu (TW)

( * ) Notice: Subject to any disclaimer, the term of this patent is extended or adjusted under 35 U.S.C. 154(b) by 0 days.

(21) Appl. No.: 11/403,418

(22) Filed: Apr. 12, 2006

(65) Prior Publication Data

US 2007/0053649 A1 Mar. 8, 2007

(30) Foreign Application Priority Data

Sep. 5, 2005 (TW) .............................. 94130279 A

(51) Int. Cl.
*G02B 6/00* (2006.01)
(52) U.S. Cl. ....................... 385/136; 385/137
(58) Field of Classification Search ................ 385/136, 385/137
See application file for complete search history.

(56) References Cited

U.S. PATENT DOCUMENTS 4,448,481 A * 5/1984 Basov et al. ................ 385/136
4,449,784 A * 5/1984 Basov et al. .................. 385/75
4,948,219 A * 8/1990 Seino et al. .................. 385/95
5,135,590 A * 8/1992 Basavanhally et al. ....... 156/64
5,194,080 A * 3/1993 Aikawa et al. ............... 65/423
6,741,784 B1 * 5/2004 Guan .......................... 385/135
2002/0154882 A1 * 10/2002 Moran ........................ 385/137
2004/0028344 A1 * 2/2004 Kang et al. ................... 385/60

* cited by examiner

*Primary Examiner*—K. Cyrus Kianni
(74) *Attorney, Agent, or Firm*—J.C. Patents

(57) ABSTRACT

An optical fiber wire clip suitable for being fixed on a base for clipping an optical fiber wire is provided. The optical fiber wire clip has a through hole. The optical fiber wire is suitable for being disposed through the through hole and clipped by a wall of the through hole. The maximum static friction between the wall of the through hole and the surface of the optical fiber wire is set to be smaller than the maximum stress that can be withstood by the optical fiber wire.

3 Claims, 5 Drawing Sheets

OPTICAL FIBER WIRE CLIP

CROSS-REFERENCE TO RELATED APPLICATION

This application claims the priority benefit of Taiwan application serial no. 94130279, filed on Sep. 5, 2005. All disclosure of the Taiwan application is incorporated herein by reference.

BACKGROUND OF THE INVENTION

1. Field of the Invention

The present invention relates to a clip for an optical device, and more particularly, to an optical fiber wire clip.

2. Description of the Related Art

The optical fiber, namely the optic conductive fiber, is an optic conductive device for transmitting the telecommunication signals under the principle of light's full reflection in the glass. The optical fiber is advantageous in its characteristics of having high bandwidth, insusceptibility to interference, and long-distance signal transmission. Accordingly, the optical fiber network system had become an indispensable element in the telecommunication network.

In recent years, the price of the optical fiber wire equipment is gradually reduced, thus the fiber to the home (FTTH) telecommunication system has become more popular. This telecommunication system applies appropriate customer premise equipment, such that the telecommunication signal is directly transmitted from a data terminal to a user terminal through the optical fiber wire. Consequently, the users using such telecommunication system can enjoy the fast and high-speed signal transmission.

However, compared with the copper cable for transmitting the same telecommunication signals, since the strength of the optical fiber wire structure is rather weak, an appropriate wiring device is usually required for the equipments in the user terminal in order to protect the optical fiber wire from damages.

FIG. 1 schematically shows a conventional optical fiber wire clip. Referring to FIG. 1, the optical fiber wire 100 mainly comprises a first clip holder 110 and a second clip holder 120. The first clip holder 110 has a plurality of bulges 112 and a fixing part 114. The second clip holder 120 has a plurality of bulges 122. The first clip holder 110 and the second clip holder 120 are suitable for relatively moving along the direction marked by the arrows in FIG. 1. Therefore, the optical fiber wire clip 100 can clamp the optical fiber wire W between the first clip holder 110 and the second clip holder 120 through the first bulges 112 and the second bulges 122.

FIG. 2 is a schematic view illustrating a case in which an optical fiber wire is fixedly clipped on the optical fiber wire disc by the optical fiber wire clip of FIG. 1. After the optical fiber wire W is clipped by the first clip holder 110 and the second clip holder 120, the optical fiber wire clip 100 is disposed in a frame 210 of the optical fiber wire disc 200. A plurality of third bulges 212 are disposed inside the frame 210. Through the fixing part 114 of the first clip holder 110 and the third bulges 212 of the frame 210, the optical fiber wire W is fixedly clipped by the optical fiber wire clip 100 on the optical fiber wire disc 200.

It is to be noted that although through the optical fiber wire clip 100 and the frame 210, the optical fiber wire W can be fixedly clipped by the optical fiber wire clip 100 on the optical fiber wire disc 200, as the optical fiber wire W is firmly clipped in the optical fiber wire clip 100, the optical fiber wire W can be easily broken when pulled by an external force.

Since the optical fiber wire W can be easily broken when pulled by the external force, in another conventional technique, the design of the optical fiber wire clip 100 is skipped, such that the optical fiber wire W is not clipped by any part when passing through the frame 210. Therefore, when the optical fiber wire W is pulled by the external force, the optical fiber wire W is not confined by the optical fiber wire clip 100, thus some buffers are provided to the optical fiber wire W when it is moving along the external force. Such design prevents the optical fiber wire W from damages. However, with such design, the optical fiber wire W cannot be exactly positioned in the optical fiber wire disc 200.

SUMMARY OF THE INVENTION

Therefore, it is an object of the present invention to provide an optical fiber wire clip in which the optical fiber wire clipped by the optical fiber wire clip is not easily broken when pulled by an external force.

The present invention provides an optical fiber wire clip suitable for being fixed on a base for clipping an optical fiber wire. The optical fiber wire clip has a through hole. The optical fiber wire is suitable for being disposed through the through hole and clipped by the wall of the through hole. The maximum static friction between the wall of the through hole and the surface of the optical fiber wire is set to be within a range of the maximum stress that can be withstood by the optical fiber wire.

In an embodiment of the present invention, the base may comprise a frame, and the optical fiber wire is suitable for being fixedly disposed on the base inside the frame.

In an embodiment of the present invention, the optical fiber wire may be a taper, and the through hole crosses over the taper along the axis of the taper.

In an embodiment of the present invention, the frame may comprise a first frame bar and a second frame bar, wherein the first frame bar and the second frame bar form an angle.

In an embodiment of the present invention, the optical fiber wire clip further comprises a slit. The slit extends from a end surface of the taper to another corresponding end surface of the taper along the axis of the taper, such that the optical fiber wire is suitable for being disposed into the through hole from one side of the taper through the slit.

In an embodiment of the present invention, the optical fiber wire clip is made of a material such as silica gel.

In the present invention, the maximum static friction between the wall of the through hole and the surface of the optical fiber wire is set to be within a range of the maximum stress that can be withstood by the optical fiber wire. Thus, when the optical fiber wire clipped by the optical fiber wire clip is pulled by an external force, the optical fiber wire relatively moves before the optical fiber wire is broken. Accordingly, the optical fiber wire clip provided by the present invention prevents the optical fiber wire from being broken when pulled by an external force larger than the normal force.

BRIEF DESCRIPTION DRAWINGS

The accompanying drawings are included to provide a further understanding of the invention, and are incorporated in and constitute a portion of this specification. The drawings illustrate embodiments of the invention, and together with the description, serve to explain the principles of the invention.

FIG. 1 schematically shows a conventional optical fiber wire clip.

FIG. 2 is a schematic view illustrating a case in which an optical fiber wire is fixedly clipped on the optical fiber wire disc by the optical fiber wire clip of FIG. 1.

FIG. 3 schematically shows an optical fiber wire clip according to an embodiment of the present invention.

DESCRIPTION PREFERRED EMBODIMENTS

Figure 1:
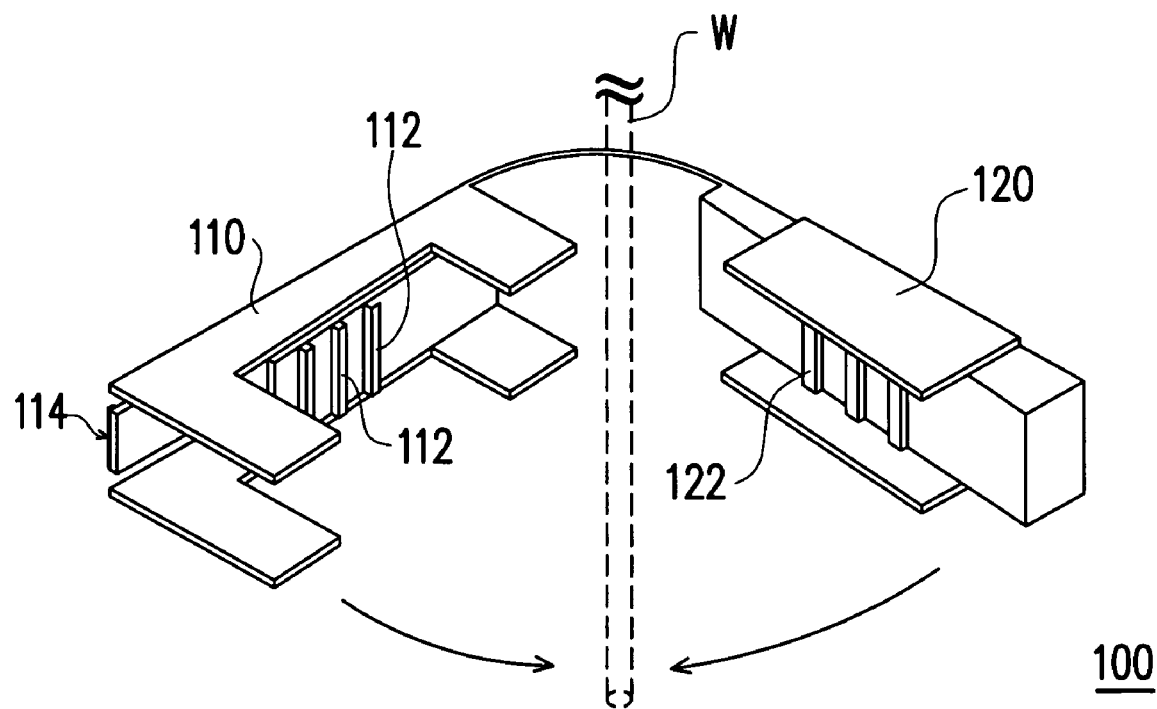
Figure 2:
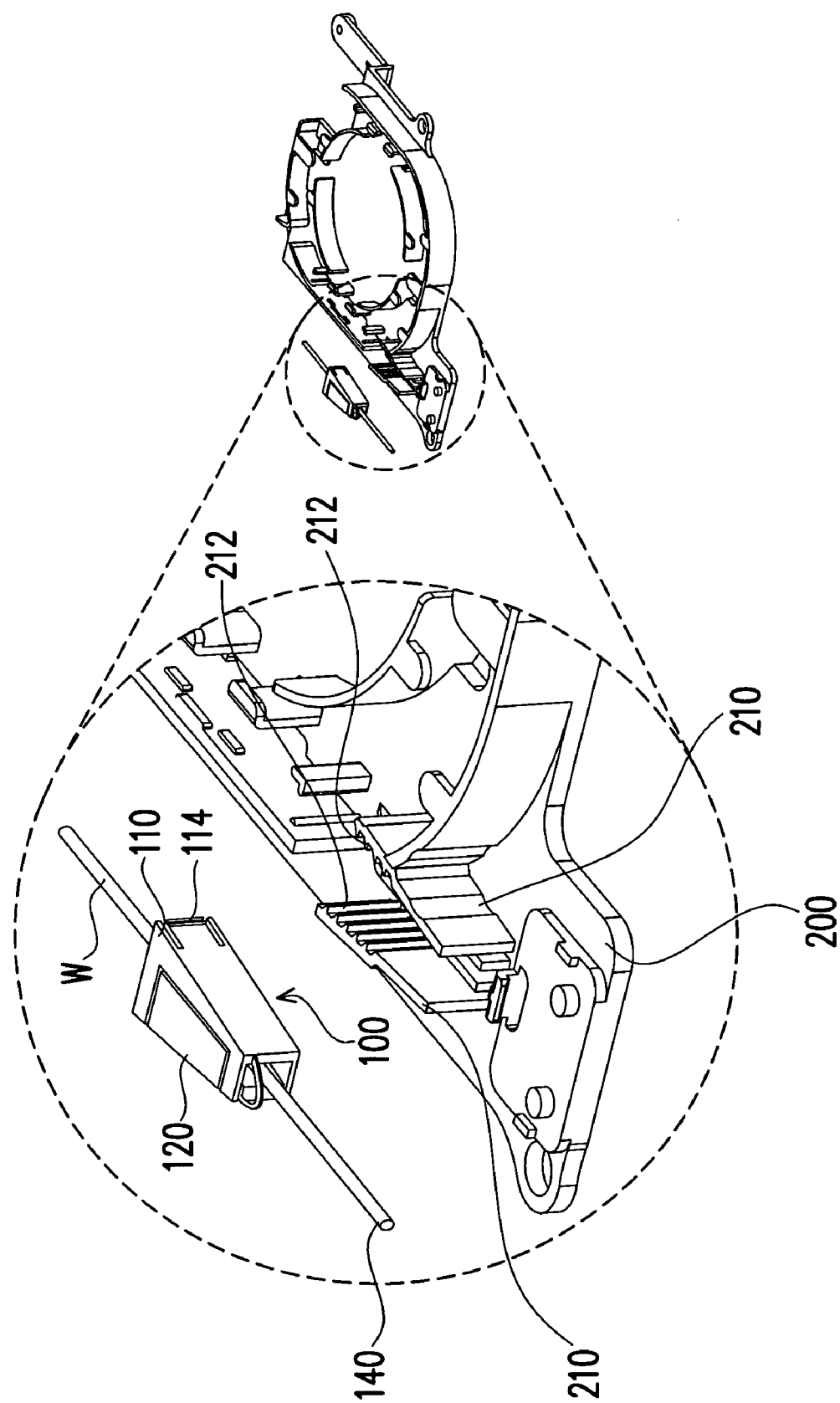
Figure 3:
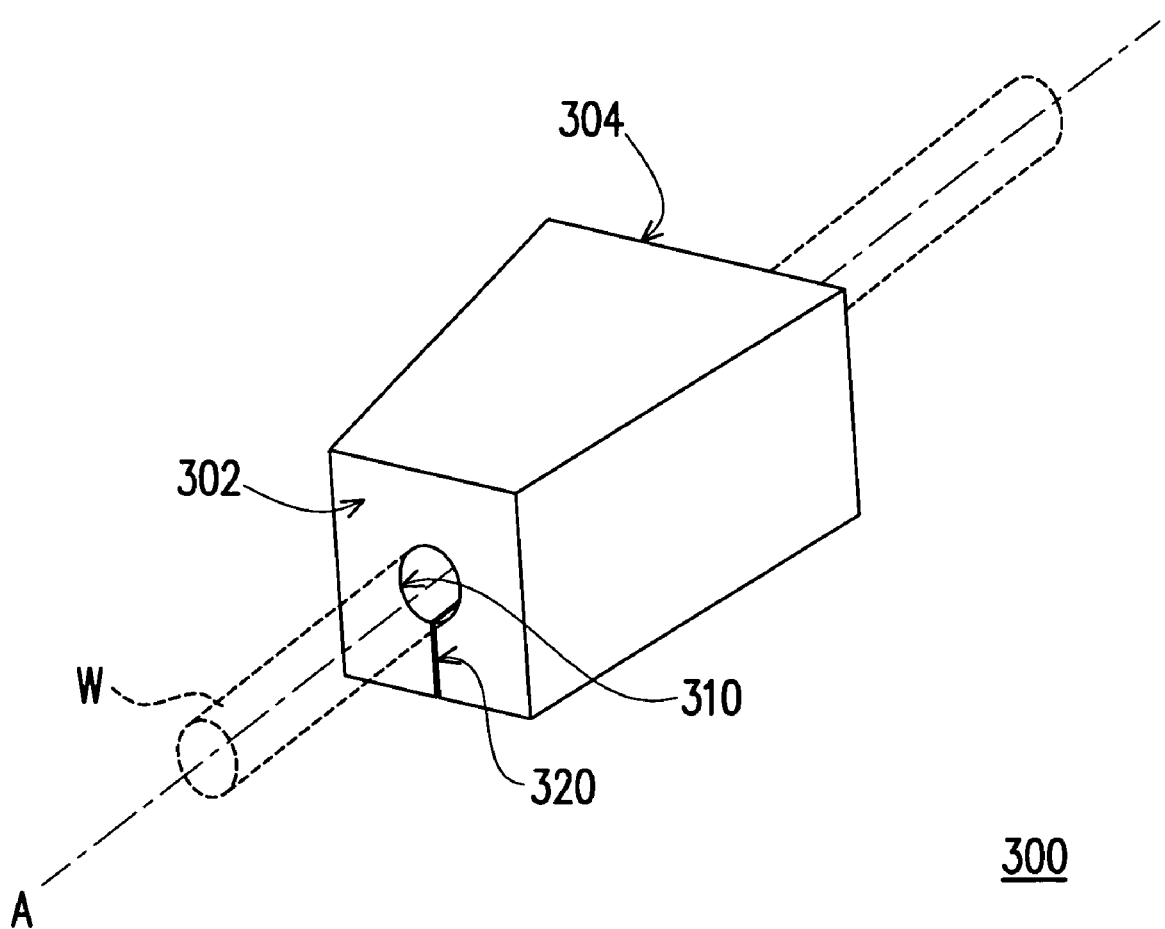

FIG. 3 schematically shows an optical fiber wire clip according to an embodiment of the present invention. Referring to FIG. 3, the optical fiber wire clip 300 comprises a through hole 310. The wall of the through hole 310 is suitable for clipping an outer surface of a segment of an optical fiber wire W, and the optical fiber wire clip 300 is made of silica gel or other material. Specifically, the optical fiber wire clip 300 disclosed in the present embodiment is a taper, and the through hole 310 crosses over the taper along the axis A of the taper. However, the shape of the optical fiber wire clip 300 disclosed in the present embodiment is not limited thereto. In other embodiments of the present invention, the shape of the optical fiber wire clip 300 may be a square, a cylinder, or other appropriate shapes.

The optical fiber wire clip 300 mentioned above is suitable for disposing the optical fiber wire W into the through hole 310, so as to clip the optical fiber wire W. In order to easily dispose the optical fiber wire W into the through hole 310, the optical fiber wire clip 300 further comprises a slit 320. The slit 320 extends from a end surface 302 of the optical fiber wire 300 to another corresponding end surface 304 of the optical fiber wire clip 300 along the axis A. Accordingly, in the present embodiment, a segment of the optical fiber wire W is suitable for being disposed into the through hole 310 from one side of the optical fiber wire clip 300 through the slit 320.

Figure 4:
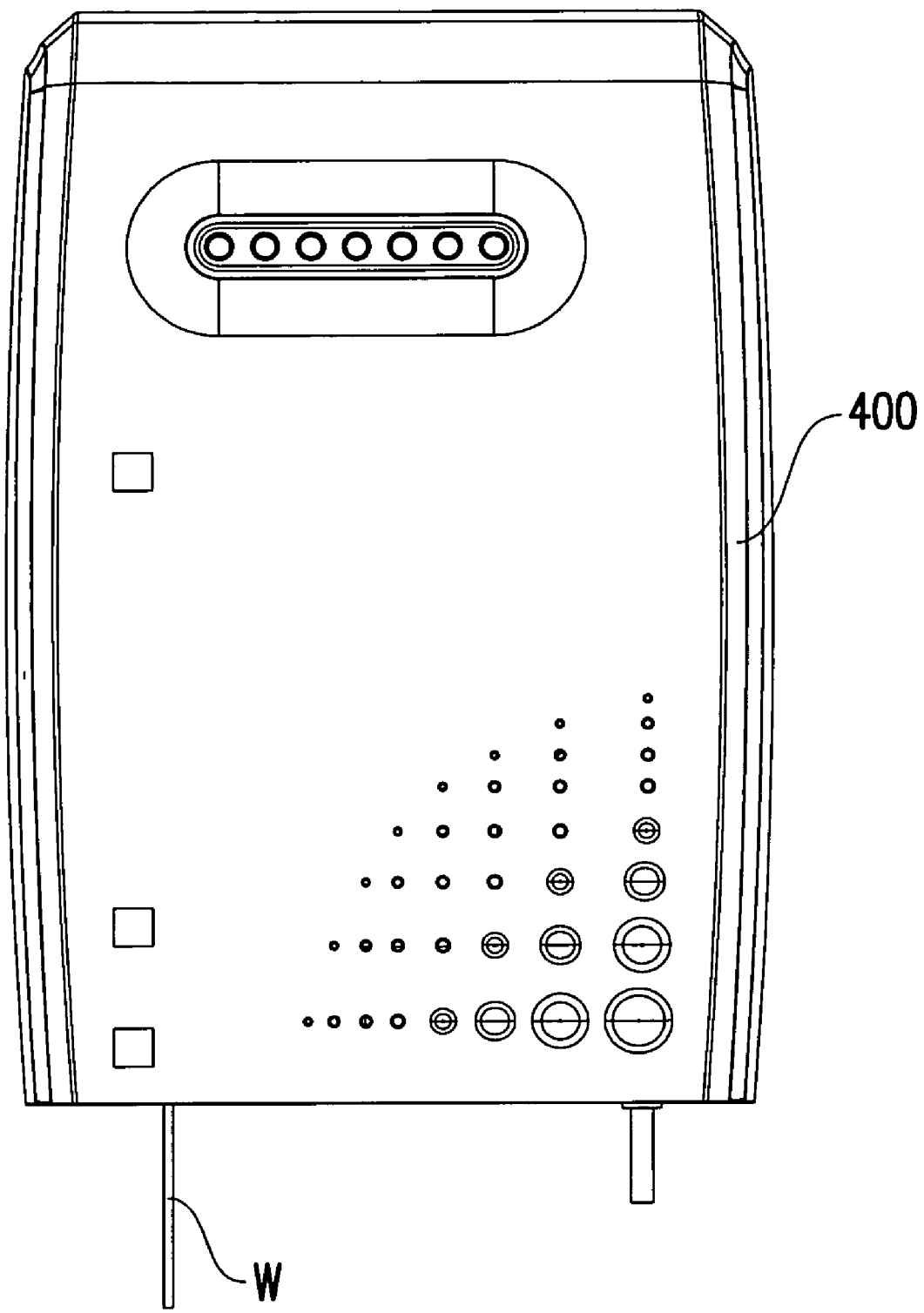
FIG. 4 is a schematic view illustrating a case in which an optical fiber wire and the optical fiber wire clip of FIG. 3 are both fixed in a telecommunication equipment.
Figure 5:
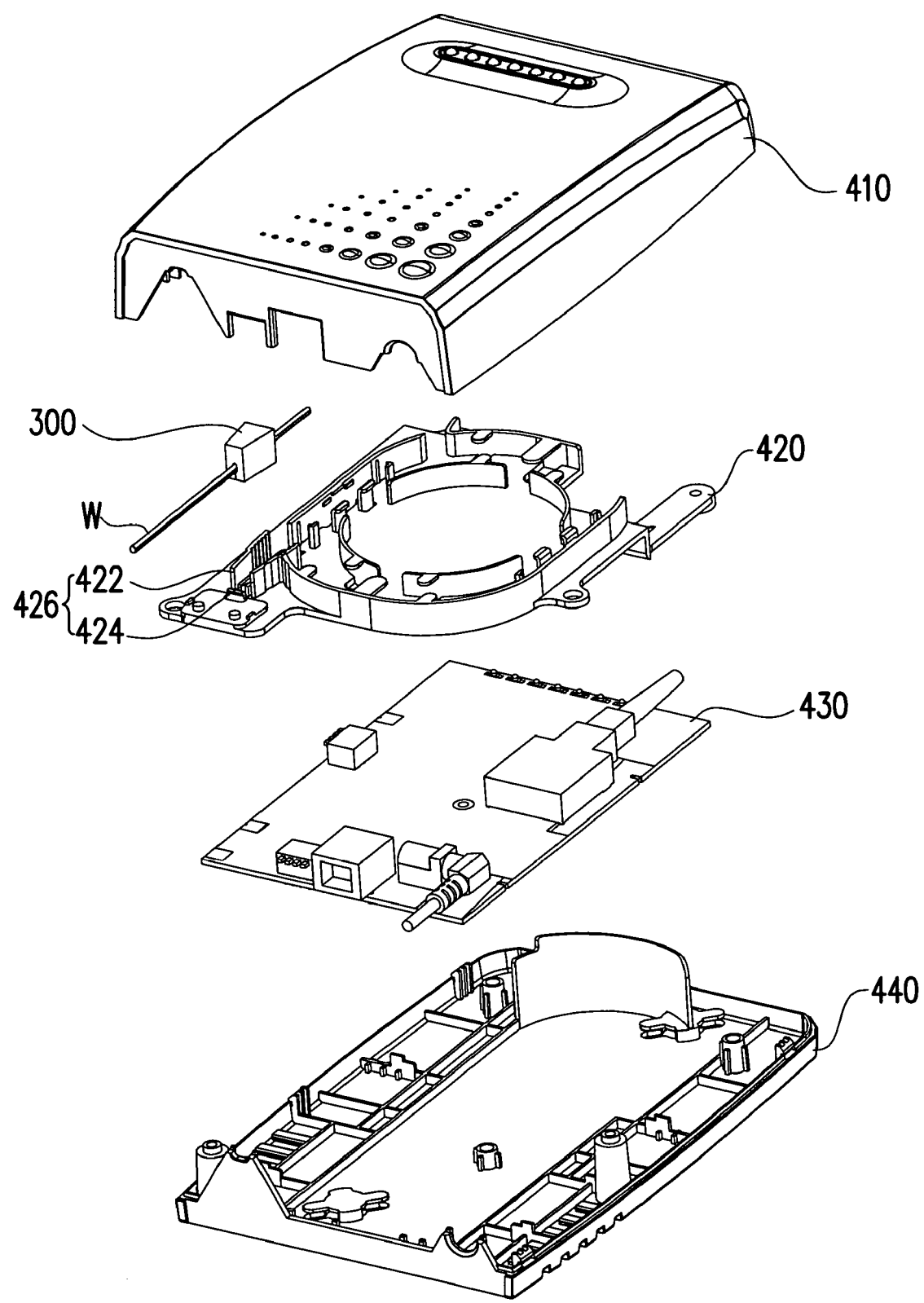
FIG. 5 is a schematic exploded view of FIG. 4.

After the optical fiber wire W is disposed into the through hole 310, the optical fiber wire clip 300 and the optical fiber wire W are both fixed in a telecommunication equipment of FIG. 4. In the present embodiment, the telecommunication equipment of FIG. 4 may be a user terminal equipment 400. FIG. 5 is a schematic exploded view of FIG. 4. Referring to FIG. 5, the user terminal equipment 400 comprises a top housing 410, a base 420, a telecommunication module 430, and a bottom housing 440. The base 420 comprises a frame 426, and the optical fiber wire clip 300 is suitable for been disposed inside the frame 426, such that the optical fiber wire W clipped by the optical fiber wire clip 300 is fixed on the base 420. In the present embodiment, the frame 426 mainly comprises a first frame bar 422 and a second frame bar 424, wherein the first frame bar 422 and the second frame bar 424 form an angle.

In order to prevent the optical fiber wire W clipped by the optical fiber wire clip 300 from being easily broken when pulled by the external force, the maximum static friction between the wall of the through hole 310 and the surface of the optical fiber wire W is set to be within a range of the maximum stress that can be withstood by the optical fiber wire. Accordingly, when the optical fiber wire W is fixedly clipped on the base 420 by the optical fiber wire clip 300 and the optical fiber wire W is pulled in a direction along the axis of the optical fiber wire W by an external force, if the external force is smaller than the maximum static friction between the wall of the through hole 310 and the surface of the optical fiber wire W, the optical fiber wire W is fixed in the through hole 310, and the optical fiber wire W does not relatively move with the optical fiber wire clip 300. On the other hand, if the external force is larger than the maximum static friction between the wall of the through hole 310 and the surface of the optical fiber wire W, the optical fiber wire W relatively moves with the optical fiber wire clip 300 along the direction of the external force. Accordingly, the optical fiber wire clip 300 can prevent the optical fiber wire W from being broken when pulled by an external force larger than the normal force.

In the present embodiment, the optical fiber wire clip 300 is made of a material such as silica gel, and the maximum static friction between the wall of the through hole 310 and the surface of the optical fiber wire W can be set by modifying the hardness of the silica gel. Specifically, in the present embodiment, the maximum static friction between the wall of the through hole 310 and the surface of the optical fiber wire W can be set by appropriately selecting the model number of the silica gel, which includes SILICON KE951U 50°, SILICON KE951U 60°, or other appropriate model numbers. In general, the optical fiber wire clip 300 starts to move when the pull force exceeds 3~3.5 Kg.

Moreover, in the present embodiment, when the optical fiber wire 300 is a taper and the first frame bar 422 and the second frame bar 424 of the frame 426 form an angle, and the optical fiber wire clip 300 is disposed inside the frame 426, by modifying the relative position between the optical fiber wire clip 300 and the frame 426, the present embodiment can adjust the degree of tightness between the first frame bar 422, the second frame bar 424 and the optical fiber wire clip 300, and further the maximum static friction between the wall of the through hole 310 and the surface of the optical fiber wire W is adjusted.

In addition to appropriate selection of the material of the optical fiber wire clip 300 and the cooperation between the optical fiber wire clip 300 and the frame 426, the maximum static friction between the wall of the through hole 310 and the surface of the optical fiber wire W also can be set by adjusting the aperture of the through hole 310 or other factors, such that the maximum static friction is set within a range of the maximum stress that can be withstood by the optical fiber wire W.

In summary, the maximum static friction set by the present invention is smaller than the maximum stress that can be withstood by the optical fiber wire. Thus, when the external force applied on the optical fiber wire is larger than the maximum stress that can be withstood by the optical fiber wire, the optical fiber wire relatively moves with the optical fiber wire clip before it is broken. The optical fiber wire is pulled by the external force in a direction along the axis of the optical fiber wire. Accordingly, the optical fiber wire clip disclosed in the present invention fixedly disposes the optical fiber wire on the base, and prevents the optical fiber wire from being broken when pulled by an external force larger than the normal force.

Furthermore, since the silica gel has such advantages as long lifespan, crack resistance, and no toxic evaporation, if the optical fiber wire clip of the present invention is made of silica gel, the optical fiber wire clip disclosed in the present invention has the same advantages such as long lifespan and no toxic evaporation.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. An optical fiber wire clip suitable for being fixed on a base for clipping an optical fiber wire, wherein the optical fiber wire clip comprises a through hole, and the optical fiber wire is suitable for being disposed through the through hole and clipped by a wall of the through hole, wherein a maximum static friction between the wall of the through hole and a surface of the optical fiber wire is being set to be smaller than a maximum stress that can be withstood by the optical fiber wire, wherein the base comprises a frame, and the optical fiber wire clip is suitable for being fixedly disposed on the base inside the frame, wherein the optical fiber wire clip is a taper, and the through hole crosses over the taper along an axis of the taper, wherein the optical fiber wire clip further comprises a slit extending from a end surface of the taper to another corresponding end surface of the taper along the axis of the taper, such that the optical fiber wire is suitable for being disposed into the through hole from one side of the taper through the slit.

2. The optical fiber wire clip of claim 1, wherein the frame comprises a first frame bar and a second frame bar, the first frame bar and the second frame bar forming an angle.

3. The optical fiber wire clip of claim 1, wherein the optical fiber wire clip is made of silica gel.

* * * * *